United States Patent
Taneja et al.

(10) Patent No.: US 11,218,213 B2
(45) Date of Patent: Jan. 4, 2022

(54) EFFICIENT OPERATION OF RELAY NODES IN A CITIZEN BROADBAND RADIO SERVICE (CBRS) NETWORK

(71) Applicant: Cisco Technology, Inc., San Jose, CA (US)

(72) Inventors: Mukesh Taneja, Bangalore (IN); Indermeet Singh Gandhi, Bangalore (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 170 days.

(21) Appl. No.: 16/678,539

(22) Filed: Nov. 8, 2019

(65) Prior Publication Data

US 2021/0143893 A1    May 13, 2021

(51) Int. Cl.
*H04B 7/155* (2006.01)
*H04L 5/14* (2006.01)
(Continued)

(52) U.S. Cl.
CPC .............. *H04B 7/155* (2013.01); *H04L 5/14* (2013.01); *H04W 16/14* (2013.01); *H04W 52/36* (2013.01);
(Continued)

(58) Field of Classification Search
CPC ............... H04B 7/155; H04B 7/15542; H04W 72/0473; H04W 72/082; H04W 72/048;
(Continued)

(56) References Cited

U.S. PATENT DOCUMENTS 10,681,560 B1 *  6/2020  Sevindik ............. H04W 72/082
2018/0035301 A1   2/2018  Nama et al.
(Continued)

FOREIGN PATENT DOCUMENTS

WO    2019066882    4/2019

OTHER PUBLICATIONS

WINNF-TS-0016-V1.2.3 SAS to CBSD Technical Specification (Year: 2018).*
(Continued)

*Primary Examiner* — Hassan Kizou
*Assistant Examiner* — Hector Reyes
(74) *Attorney, Agent, or Firm* — Edell, Shapiro & Finnan, LLC

(57) ABSTRACT

Presented herein are methodologies for managing a citizens broadband radio service (CBRS) network. The methodology includes at a spectrum access system (SAS), receiving, from a Donor CBRS base station device (CBSD), a registration request, the registration request including capabilities information about a CBRS Relay Node with which the Donor CBSD communicates, in response to the registration request, sending, from the SAS to the Donor CBSD, a registration response indicating successful registration of the CBRS Relay Node, in response to the registration response, receiving via the Donor CBSD a spectrum enquiry message from the CBRS Relay Node seeking a channel allocation from the SAS, and in response to the spectrum enquiry message, sending from the SAS, and via the Donor CBSD, a resource grant response to the CBRS Relay Node, wherein the resource grant response includes an allocated channel and a maximum EIRP for the allocated channel.

20 Claims, 11 Drawing Sheets

(51) Int. Cl.
*H04W 60/00* (2009.01)
*H04W 52/36* (2009.01)
*H04W 72/04* (2009.01)
*H04W 16/14* (2009.01)
*H04W 72/08* (2009.01)

(52) U.S. Cl.
CPC ......... *H04W 60/00* (2013.01); *H04W 72/048* (2013.01); *H04W 72/0473* (2013.01); *H04W 72/082* (2013.01)

(58) Field of Classification Search
CPC ..... H04W 60/00; H04W 52/36; H04W 16/14; H04W 28/26; H04L 5/14
See application file for complete search history.

(56) References Cited

U.S. PATENT DOCUMENTS

| | | | | |
|---|---|---|---|---|
| 2018/0132111 | A1* | 5/2018 | Mueck | H04B 1/7136 |
| 2018/0288621 | A1* | 10/2018 | Markwart | H04L 5/0035 |
| 2018/0376342 | A1 | 12/2018 | Macmullan et al. | |
| 2019/0058999 | A1 | 2/2019 | Gunasekara et al. | |
| 2019/0335337 | A1 | 10/2019 | Damnjanovic et al. | |
| 2020/0252933 | A1* | 8/2020 | Hmimy | H04W 72/0453 |
| 2021/0076346 | A1* | 3/2021 | Daoud | H04W 60/04 |
| 2021/0127346 | A1* | 4/2021 | Hmimy | H04W 72/14 |
| 2021/0136838 | A1* | 5/2021 | Khalid | H04L 43/00 |

OTHER PUBLICATIONS

WINNF-TS-0016-V1.2.4 SAS to CBSD Technical Specification (Year: 2019).*
Wirelessinnovation, "Requirements for Commercial Operation in the U.S. 3550-3700 MHz Citizens Broadband Radio Service Band", Document WINNF-15-S-0112, https://www.wirelessinnovation.org/assets/work_products/Specifications/winnf-15-s-0112-v1.0.0%20cbrs%20operational%20and%20functional%20requirements.pdf, May 12, 2016, 41 pages.
Parvez et al., "CBRS Spectrum Sharing Between LIE-U and WIFI: A Multiarmed Bandit Approach," Mobile Information Systems, vol. 2016, Article ID 5909801, https://www.hindawi.com/journals/misy/2016/5909801/, Jul. 19, 2016, pp. 1-13.
CBRS Alliance, "OnGo Wireless Coverage—In-Building, Public Space & Industrial IoT", https://www.cbrsalliance.org/, downloaded Nov. 8, 2019, 5 pages.
The Wireless Innovation Forum, "Welcome to the Wireless Innovation Forum", https://www.wirelessinnovation.org/, downloaded Nov. 8, 2019, 2 pages.
Du Ho Kang et al., "Coexistence Performance of GAA Use Cases using LTE-TDD Technologies in 3.5GHz CBRS Spectrum", 2018 IEEE International Symposium on Dynamic Spectrum Access Networks (DySPAN), Oct. 2018, https://ieeexplore.ieee.org/document/8610475, 2 pages.
Matthew Tonnemacher et al., "Opportunistic Channel Access Using Reinforcement Learning in Tiered CBRS Networks", 2018 IEEE International Symposium on Dynamic Spectrum Access Networks (DySPAN), Oct. 2018, https://ieeexplore.ieee.org/document/8610474, 3 pages.

* cited by examiner

EFFICIENT OPERATION OF RELAY NODES IN A CITIZEN BROADBAND RADIO SERVICE (CBRS) NETWORK

TECHNICAL FIELD

The present disclosure relates to the operation of a Citizen Broadband Radio Service network, and particularly to managing relay nodes in such a network.

BACKGROUND

Citizen Broadband Radio Service (CBRS) is a 150 MHz wide broadcast band in the 3550-3700 MHz frequency range, time division-long term evolution (TD-LTE) band 48. Access to spectrum in the CBRS band is through the use of a Spectrum Access System (SAS), which protects incumbents from interference from lower tier priority access license (PAL) and general authorized access (GAA) users, and protects PAL users from interference from other PAL users and GAA users. The SAS maintains a database of spectrum usage (by incumbent, PAL, and GAA users) in all census tracts (or areas) and allocates channels to CBRS Base Station Devices (CBSDs) (i.e., access points (APs)) using a variety of rules including the following.

Tier 1 users: incumbents (such as navy ships, military radars and fixed satellite service earth stations) are allowed access to all the channels.

Tier 2 users: PAL users are granted access in the 3550-3650 MHz band and are allowed to use a maximum of 7 10 MHz channels in a census tract (or an area). No licensee can take more than 4 PAL channels in a census tract.

Tier 3 users: GAA users are allowed access to all the channels but only the ones not being used by above users.

The SAS may consider multiple factors (such as those above) to determine appropriate spectrum allocation, and, in turn, informs CBSDs of operating parameters (such as frequency band or channel, and maximum Effective Isotropic Radiated Power (EIRP)) that the CBSDs can use (i.e., to employ with User Equipment (UE)) at a given point in time. In some implementations, CBSDs, CBRS client devices (e.g., CBRS UEs), and an Evolved Packet Core (EPC) may be deployed as part of a private enterprise. Such a deployment can present several challenges, depending on the topology.

DESCRIPTION OF EXAMPLE EMBODIMENTS

Overview

Presented herein are methodologies for managing a citizens broadband radio service (CBRS) network. The methodology includes at a spectrum access system (SAS), receiving, from a Donor CBRS base station device (CBSD), a registration request, the registration request including capabilities information about a CBRS Relay Node with which the Donor CBSD communicates, in response to the registration request, sending, from the SAS to the Donor CBSD, a registration response indicating successful registration of the CBRS Relay Node, in response to the registration response, receiving via the Donor CBSD a spectrum enquiry message from the CBRS Relay Node seeking a channel allocation from the SAS, and in response to the spectrum enquiry message, sending from the SAS, and via the Donor CBSD, a resource grant response to the CBRS Relay Node, wherein the resource grant response includes an allocated channel and a maximum Equivalent Isotropically Radiated Power (EIRP) for the allocated channel.

A device or apparatus is also described. The device may be a SAS, or some other device. The device may include an interface unit configured to enable network communications, a memory, and one or more processors coupled to the interface unit and the memory, and configured to: receive, from a Donor citizens broadband radio service (CBRS) base station device (CBSD), a registration request, the registration request including capabilities information about a CBRS Relay Node with which the Donor CBSD communicates, in response to the registration request, send to the Donor CBSD, a registration response indicating successful registration of the CBRS Relay Node, in response to the registration response, receive via the Donor CBSD a spectrum enquiry message from the CBRS Relay Node seeking a channel allocation, and in response to the spectrum enquiry message, send, via the Donor CBSD, a resource grant response to the CBRS Relay Node, wherein the resource grant response includes an allocated channel and a maximum Equivalent Isotropically Radiated Power (EIRP) for the allocated channel.

EXAMPLE EMBODIMENTS

Figure 1:
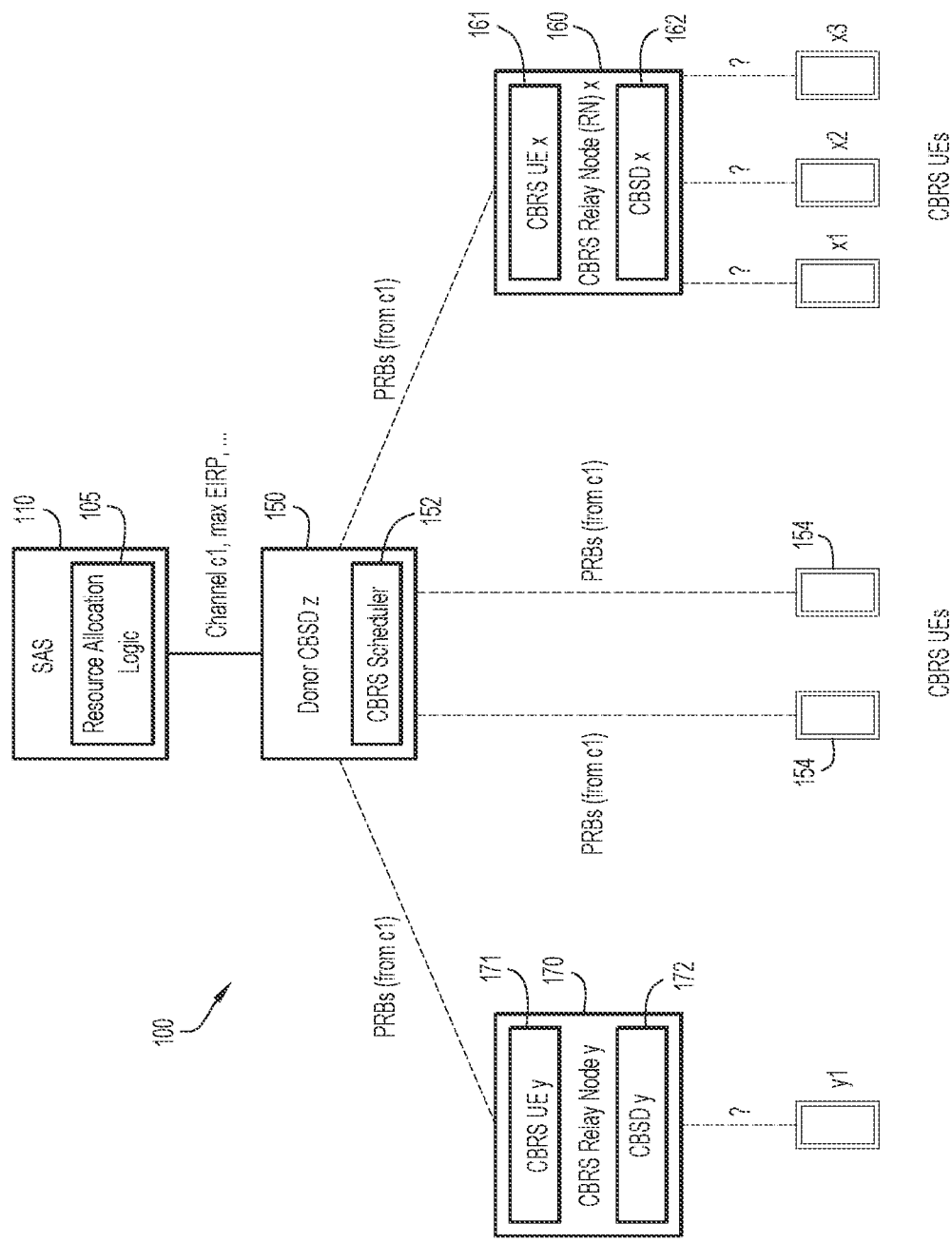
FIG. 1 shows a CBRS network topology and resource allocation logic in accordance with an example embodiment.

FIG. 1 shows a CBRS network topology and resource allocation logic in accordance with an example embodiment.

As shown, the topology 100 includes a spectrum access system (SAS) 110 that hosts resource allocation logic 105, a Donor CBRS Base Station Device (CBSD) z 150, a CBRS scheduler 152, a CBRS relay node (RN) x 160, a CBRS RN y 170, CBRS UEs 154, CBRS UEs x1, x2, x3 and CBRS UE y1. CBRS RN x 160 includes a CBRS UE x function 161 to communicate with Donor CBSD z 150, and a CBSD x function 162 to communicate with CBRS UEs x1, x2, x3. CBRS RN x 170 includes a CBRS UE y function 171 to communicate with Donor CBSD z 150, and a CBSD y function 172 to communicate with CBRS UE y1. CBRS scheduler 152 is responsible for receiving an indication of available channel and maximum EIRP information from SAS 110 and allocating the same directly to CBRS UEs 154, and to CBRS RN x 160 and to CBRS RN y 170, in the form of physical resource blocks (PRBs). In turn, CBRS RN x 160 and CBRS RN y 170 allocate spectrum resources to CBRS UEs x1, x2, x3 and y1, respectively. As will be explained more fully below, resource allocation logic 105 determines how best to allocate channels to network elements such as Donor CBSD z 150 and CBRS RNs in the network.

As those skilled in the art will appreciate, CBRS RNs are used to provide enhanced coverage and capacity (e.g., at cell edges). It should be noted that the CBRS RNs described herein are different from, e.g., a repeater in that the described CBRS RNs are configured to demodulate and decode received data, perform LTE (CBRS) protocol processing, and then transmit a new signal. Two types of CBRS RNs may be deployed in the context of the embodiments described herein: an "inband relay" and an "outband relay."

With an inband relay, both air-interfaces of the CBRS RN use the same frequency. If a given CBRS RN uses the same frequency on both of its air-interfaces simultaneously, there may be higher interference at that CBRS RN. One way to address this issue is to implement time division multiplexing at the CBRS RN where some time slices are used for the CBRS UE interface (e.g., 161, 171) for communication with Donor CBSD z 150, and some other time slices are used for the CBSD interface of the RN (e.g., 162, 172)). In such a configuration, a CBRS RN works in a half-duplex (HD) mode. Another way to address interference associated with an inband relay is to transmit and receive at the same time, using increased isolation between the respective transmit and receive antennas. In such a configuration, the CBRS RN works in a full-duplex (FD) mode, but this is typically a more costly implementation.

With an outband relay, the air-interfaces of the CBRS RN use different frequencies. Such an outband RN operates in FD mode, and is easier to deploy and operate.

There are several additional categorizations of CBRS RNs, as follows:

Type I LTE relay: These LTE relays control their cells with their own identity including the transmission of their own synchronization channels and reference symbols. Type 1 relays appear as if they are a CBSD to UEs.

Basic Type 1 LTE RN provides half duplex with inband transmissions.

Type 1.a: outband RN, which can transmit and receive at the same time (i.e., FD RNs); and Type 1.b: inband RN, which provides sufficient isolation between its transmit and receive antennas. Such RNs have potentially higher cost, but do operate in FD mode.

Type 2 LTE RN: These LTE RNs do not have their own cell identity and look just like a main cell. Any UE in range is not able to distinguish a relay from a main eNodeB (i.e., Donor CBSD) within the cell. Control information can be transmitted from the Donor CBSD and user data from the LTE relay.

With reference again to FIG. 1, and in view of the foregoing definitions and categorizations, certain limitations of CBRS RNs may become evident.

I) In FIG. 1, SAS 110 allocates resources (such as spectrum, max EIRP, . . . ) for Donor CBSD z 150 to which it is connected, but SAS 110 may not be configured to allocate any resources for CBRS RN x 160 or CBRS RN y 170.

Note that it is unlikely that CBRS RN x 160 or CBRS RN y 170 would be connected via a wired interface to SAS 110.

II) As noted above, there may be different types of CBRS RNs deployed in a private enterprise including Type I, Type II, inband/outband, half-duplex/full-duplex CBRS RNs. SAS 110 is unlikely to have knowledge of individual devices in a given private enterprise deployment, leading to multiple possible issues.

III) With LTE-TDD (time division duplex), an LTE base station uses a TDD format that consists of a pattern of slots for downlink (DL) and uplink (UL) communication. For example, LTE TDD configuration 1 supports DSUUDD-SUUD which provides that LTE subframe numbers 0, 4, 5 and 9 can be used for DL communication, subframe numbers 2, 3, 7 and 8 can be used for UL communication, and subframe numbers 1 and 6 are reserved for special frames.

As shown in FIG. 1, Donor CBSD z 150 may serve many CBRS RNs (160, 170) in a given area and each such CBRS RN may have a different type of requirement for TDD frame format, depending on the traffic requirements of the UEs that each CBRS RN is serving. For example, some RNs may have higher DL traffic while some other RNs may have higher UL traffic. Since Donor CBSD z 150 chooses its own TDD frame format, incompatible TDD frame formats may result for some devices (i.e., RNs or UEs), thus degrading their performance by, e.g., increasing latency or even degrading overall throughput.

In another scenario, if a given CBRS RN is assigned a same frequency on both of its air-interfaces and if it is a half-duplex CBRS RN, performance may be degraded.

Embodiments described herein provide approaches to appropriately allocate resources to CBRS RNs, 160, 170.

Approach I: Resource Allocation for CBSD of CBRS RN

Figure 2:
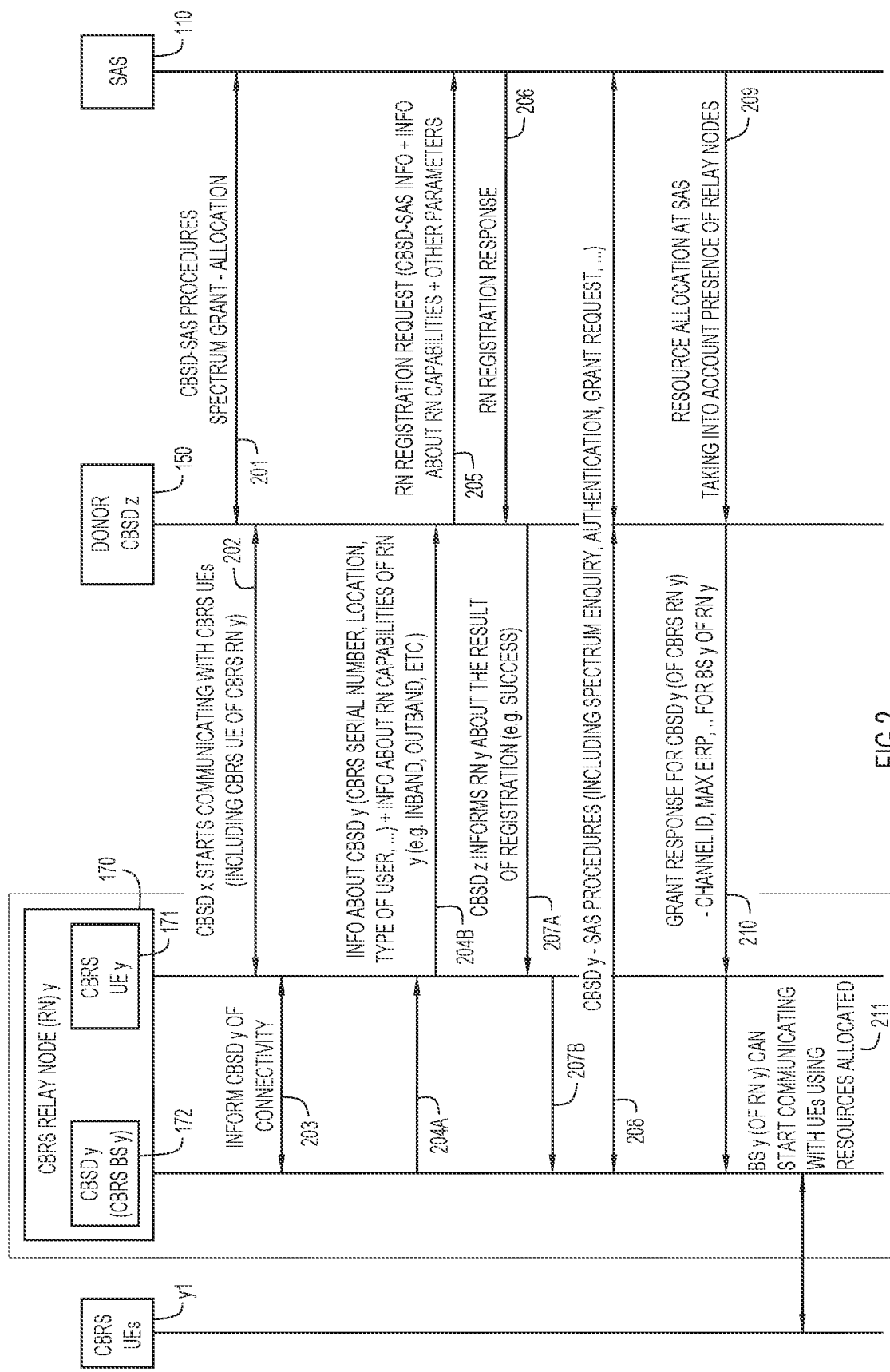
FIG. 2 is a ladder diagram depicting a series of operations for allocating resources to a CBSD of a CBRS RN in accordance with an example embodiment.

FIG. 2 is a ladder diagram depicting a series of operations for allocating resources to a CBSD of CBRS RN in accordance with an example embodiment. At 201, Donor CBSD z 150 registers with SAS 110. As part of an initial set-up procedure, SAS 110 grants assigned resources to Donor CBSD z 150 (e.g., channel, max EIRP, . . . ). At 202, Donor CBSD z 150 starts communicating with CBRS UEs, including CBRS UE y 171 of CBRS RN y 170. At 203, CBRS UE y 171 (of CBRS RN y 170) detects that it has connectivity to Donor CBSD z 150, and as such informs CBSD y 172 of such connectivity.

In response to being informed of the connectivity with Donor CBSD z 150, at 204A and 204B, CBSD y 172 sends a message to Donor CBSD z 150 indicating that it is a CBRS RN and is looking for resources to be assigned to it. This message can be conveyed, e.g., by enhancing the LTE RRC (Radio Resource Control) protocol for CBRS RNs. As part of this message, CBRS UE y 171 conveys parameters needed for registration with SAS 110 such as CBSD serial number, CBSD category, location, etc. of CBSD y 172. In addition, CBSD y 172 identifies the type of RN it is, namely, Basic Type I, Type IA, Type IB or Type II, inband or outband, half-duplex or full-duplex or a RN with multiple types of capabilities (e.g., Type I and II).

At 205, Donor CBSD z 150 continues its normal operation but, in accordance with an example embodiment, sends a new registration request for RN message, i.e., "RNRegistrationRequest," to SAS 110 with relevant parameters. In the event there are multiple CBRS RNs that are to be registered, Donor CBSD z 150 can send all such requests in a same message to SAS 110.

From operation 205, SAS 110 learns that there is at least one CBRS RN communicating via Donor CBSD z 150 and also learns the relevant parameters for such relay nodes. In response to receiving that information, at 206, SAS 110 sends a "RNRegistrationResponse" message, indicating that registration has been successful.

At 207A, 207B, Donor CBSD z 150 informs CBSD y 172 that registration with SAS 110 was successful. At 208, SAS 110 communicates with CBSD y 172 using SAS-CBSD procedures, just like SAS 110 might communicate with Donor CBSD z 150. SAS 110 may also establish a security association with each RN, in this case CBRS RN y 170.

At 209, SAS 110 (i.e., resource allocation logic 105) performs enhanced resource allocation taking into account the presence of CBRS RN y 170 (and any other CBRS RNs). For example, SAS 110 considers specific parameters such as capabilities of CBRS RN y 170 (as indicated earlier), location of the CBRS RN, measurement reports and various other parameters while deciding about resources to be allocated to each CBRS RN.

At 210, Donor CBSD z 150 forwards a grant response for CBSD y 172 including, e.g., Channel id, max EIRP, etc. Once successfully processed, suitable channels along with the max EIRP permitted can be implemented by CBSD y 172. CBSD y 172 can then start using these channels to communicate with CBRS UE y1 that is communicating with CBRS RN y 170.

Figure 3:
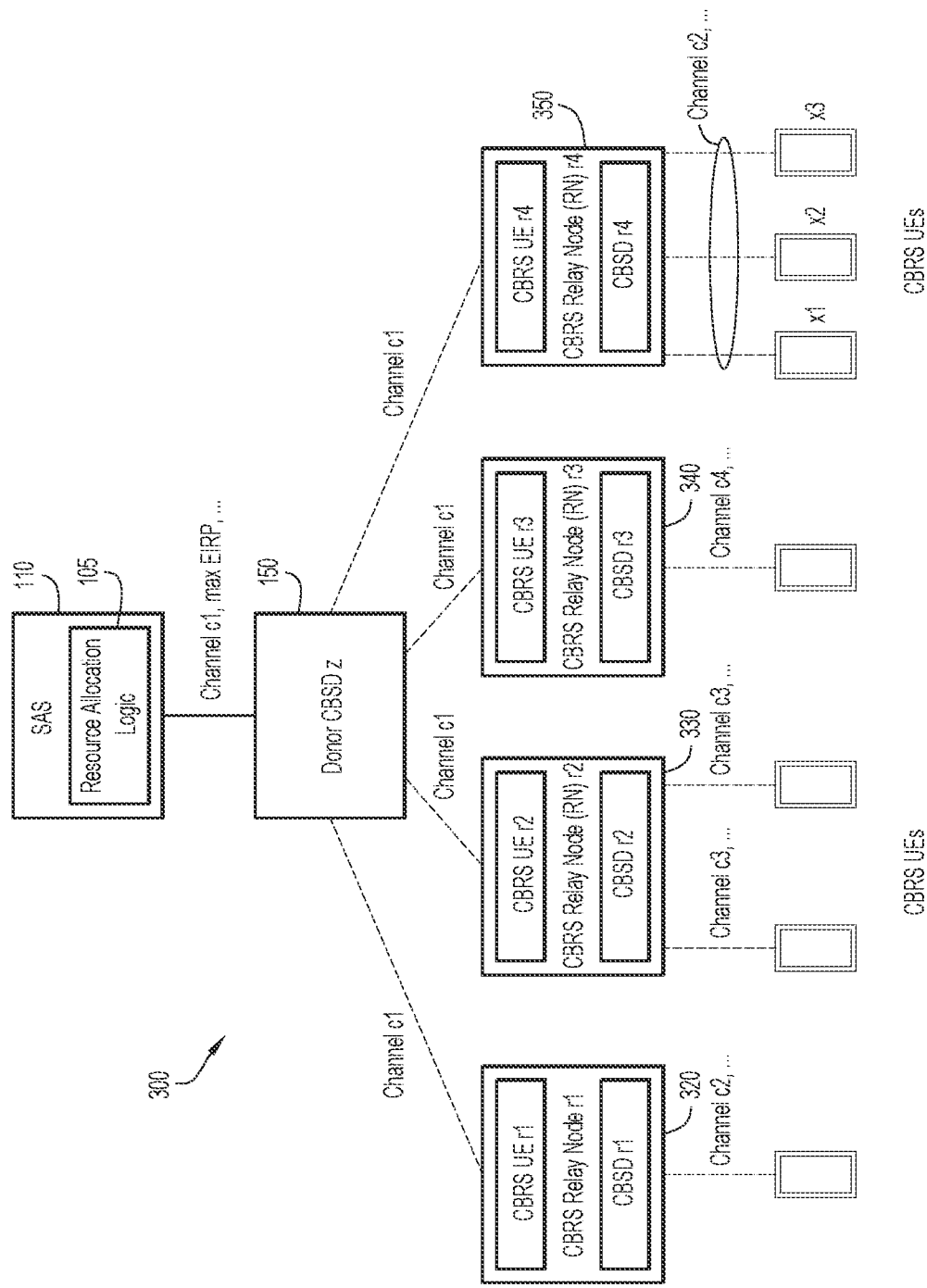
FIG. 3 is a ladder diagram depicting a series of operations for a scenario in which a SAS changes allocated resources for a CBRS when CBRS RNs are active in the network in accordance with an example embodiment.

Approach II: SAS Changes Allocated Resources for a CBRS when CBRS RNs are Active in the Network Reference is now made to FIG. 3, which shows a CBRS network topology 300 and resource allocation logic in accordance with an example embodiment. It is quite possible that SAS 110 might have a need to change channels allocated to Donor CBSD z 150. However, as SAS 110 changes channels for Donor CBSD z 150, interference on CBRS RNs 320, 330, 340, 350 can change drastically. For example, Donor CBSD z 150 could be using channel c1 to communicate with CBRS UEs (including UEs functions CBRS UE r1, CBRS UE r2, CBRS UE r3, CBRS UE r4 of CBRS RNs 320, 330, 340, 350 that communicate with Donor CBSD z 150).

Figure 4:
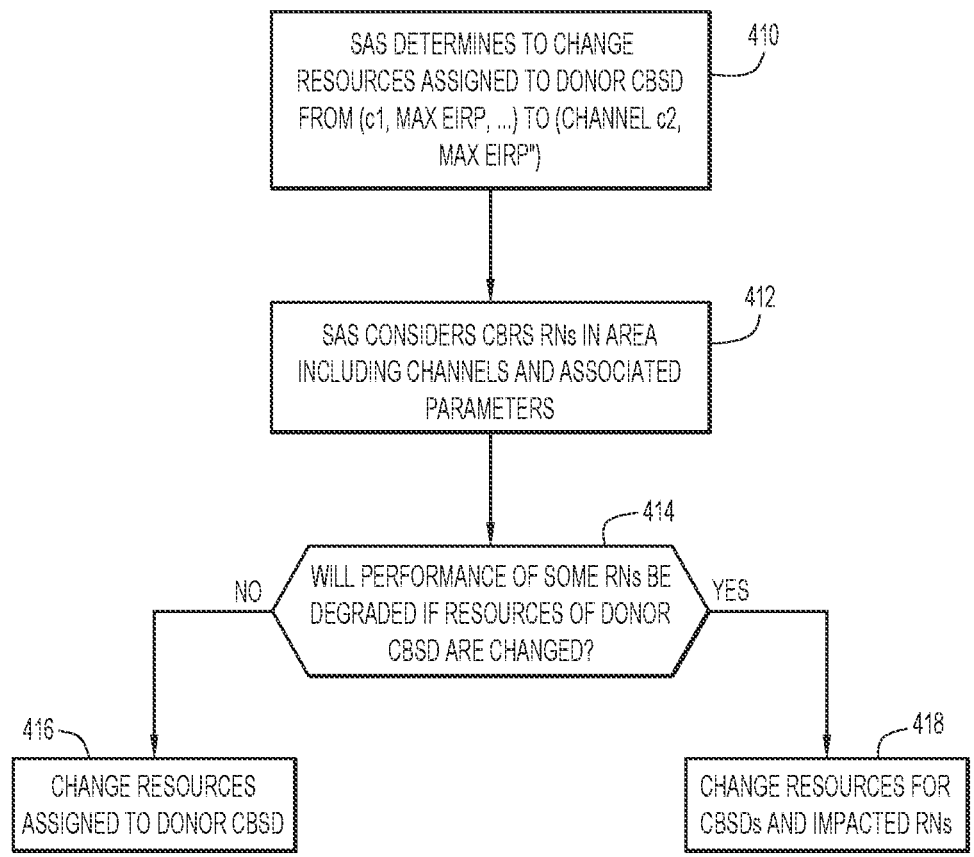
FIG. 4 is a flow chart depicting a series of operations for handling channel changes for a CBSD that communicates with CBRS RNs in accordance with an example embodiment.

Assume that there are four CBRS RNs 320, 330, 340, 350 in a given area and Donor CBSD z 150 initially assigned channel ids c2, c3, c4, c2 (i.e. r1:c2, r2:c3, r3:c4, r4:c2). Now, suppose SAS 110 needs to change the channel of Donor CBSD z 150 from c1 to c2. Such a change might create interference at two CBRS RNs 320, 350 (i.e. r1 and r4) since, in this example, the CBSDs of those RNs were initially assigned channel c2 for communication with their UEs. It is also possible that some of these CBRS RNs are not equipped to handle this interference (e.g., they are outband CBRS RNs only). This scenario is addressed as follows, and with reference to FIG. 4, which is a flow chart depicting a series of operations for handling channel changes for a Donor CBSD that communicates with CBRS RNs.

At 410, SAS 110 determines to change a channel allocated to Donor CBSD z 150 (e.g. from c1 to c2 in this example). At 412, instead of directly changing the channel for Donor CBSD z 150, SAS 110 considers the CBRS RNs that are communicating via this (or near-by) Donor CBRS z 150 and considers parameters such as channels used by such CBRS RNs (e.g., 320, 330, 340, 350) (for their CBSDs), type of RN (or capabilities in terms of inband/outband/HD/FD, Type 1/2, etc.) and other relevant parameters.

At 414, SAS 110 undertakes channel management optimization based on the foregoing factors and determines whether the performance of one or more CBRS RNs will be degraded if resources are changed for the Donor CBSD. For example, SAS 110 can determine whether changing the channel for Donor CBSD z 150 (e.g., from c1 to c2) is going to increase interference for selected RNs (e.g., r1 and r4 in the instant example) and some of these RNs (e.g., r4) do not have the capability to handle such interference (e.g., if RN r4 is an outband type of RN and cannot handle inband transmissions). If no such interference is expected, then at 416, SAS 110 can change the resource allocation for Donor CBSD 150 without further changes.

On the other hand, if performance of one or more of the CBRS RNs will be degraded, then, at 418, SAS 110 changes the resource allocation for both the Donor CBSD and impacted CBRS RNs.

Figure 5:
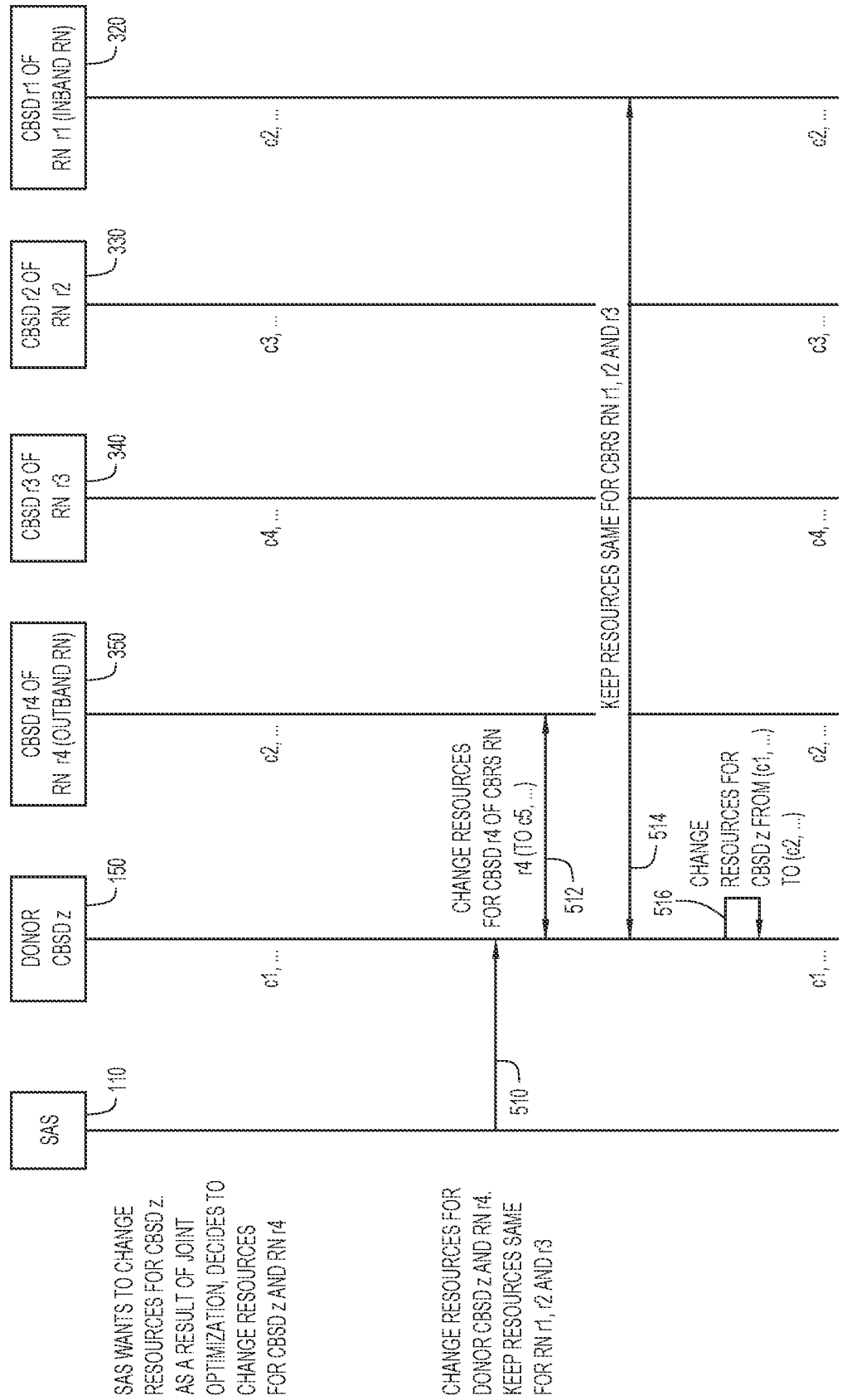
FIG. 5 is a ladder diagram depicting a series of operations for a scenario in which a SAS changes allocated resources for a Donor CBRS and a CBRS RN in accordance with an example embodiment.

FIG. 5 is a ladder diagram depicting a series of operations for a scenario in which SAS changes allocated resources for a Donor CBRS and a CBRS RN in accordance with an example embodiment. As shown in the drawing, Donor CBSD z 150 initially communicates via channel c1, CBRS RN 350 communicates via channel c2, CBRS RN 340 communicates via channel c4, CBRS RN 330 communicates via channel c3, and CBRS RN 320 communicates via channel c2. As a result of the optimization performed by SAS 110 (i.e., resource allocation logic 105) regarding interference, SAS 110 determines that resources for Donor CBSD z 150 and CBRS RN 350 are to be changed, whereas the resource allocation for CBRS RNs 320, 330, and 340 should remain unchanged. As a result, at 510, instructions to that effect are transmitted to Donor CBSD z 150. At 512, Donor CBSD z 150 communicates a resource change from channel c2 to channel c5 to CBRS RN 350, and at 514 the resources of the remaining CBRS RNs 320, 330, and 340 are indicated as not changing. At 516, Donor CBSD z 150 changes its channel from c1 to channel c2.

Approach III: SAS Changes Allocated Resources for a CBRS Relay Node

In a similar vein, if SAS 110 wants to change resources (channel, max EIRP, . . . ) for a given CBRS RN, SAS 110 may consider (i) resources used by Donor CBSD z 150 and other CBRS RNs in that area, (ii) capabilities of the given CBRS RN and other CBRS RNs in that area, and (iii) other relevant parameters to make a decision to minimize interference and optimize performance in that network. Such a decision could involve changing resources not only for the given CBRS RN but also for Donor CBSD z 150 and other CBRS RNs in that area.

Figure 6:
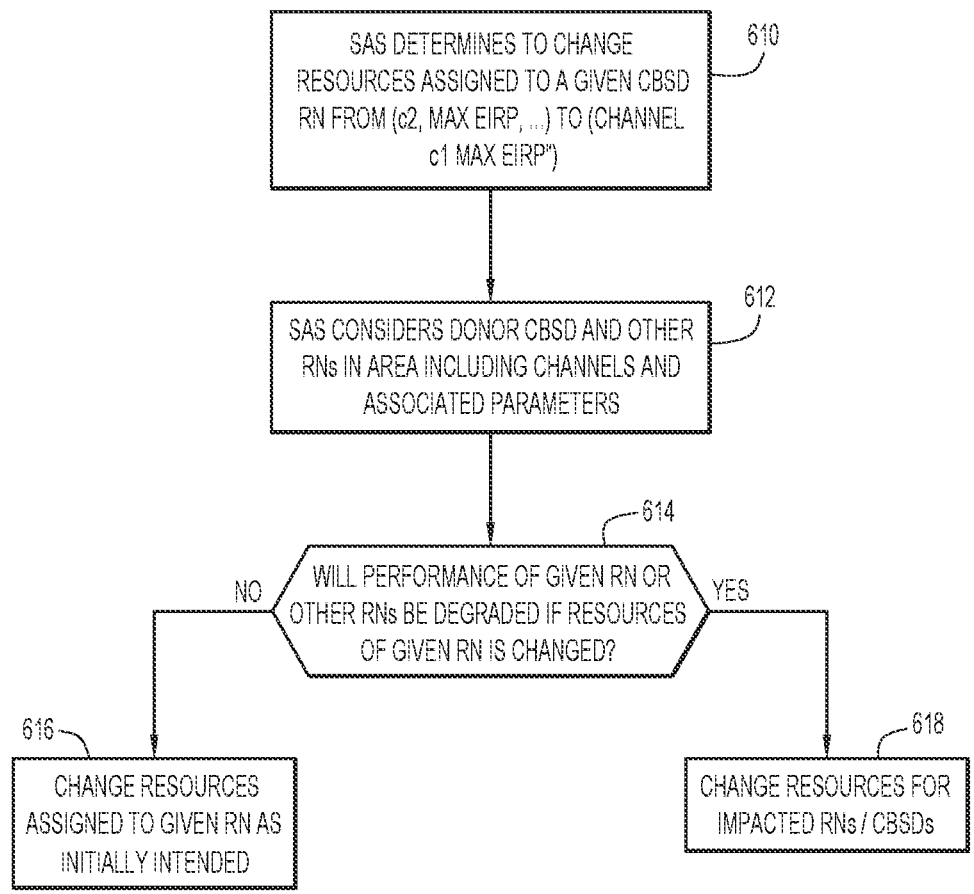
FIG. 6 is a flow chart depicting a series of operations for handling channel changes for a CBRS RN in accordance with an example embodiment.
Figure 7:
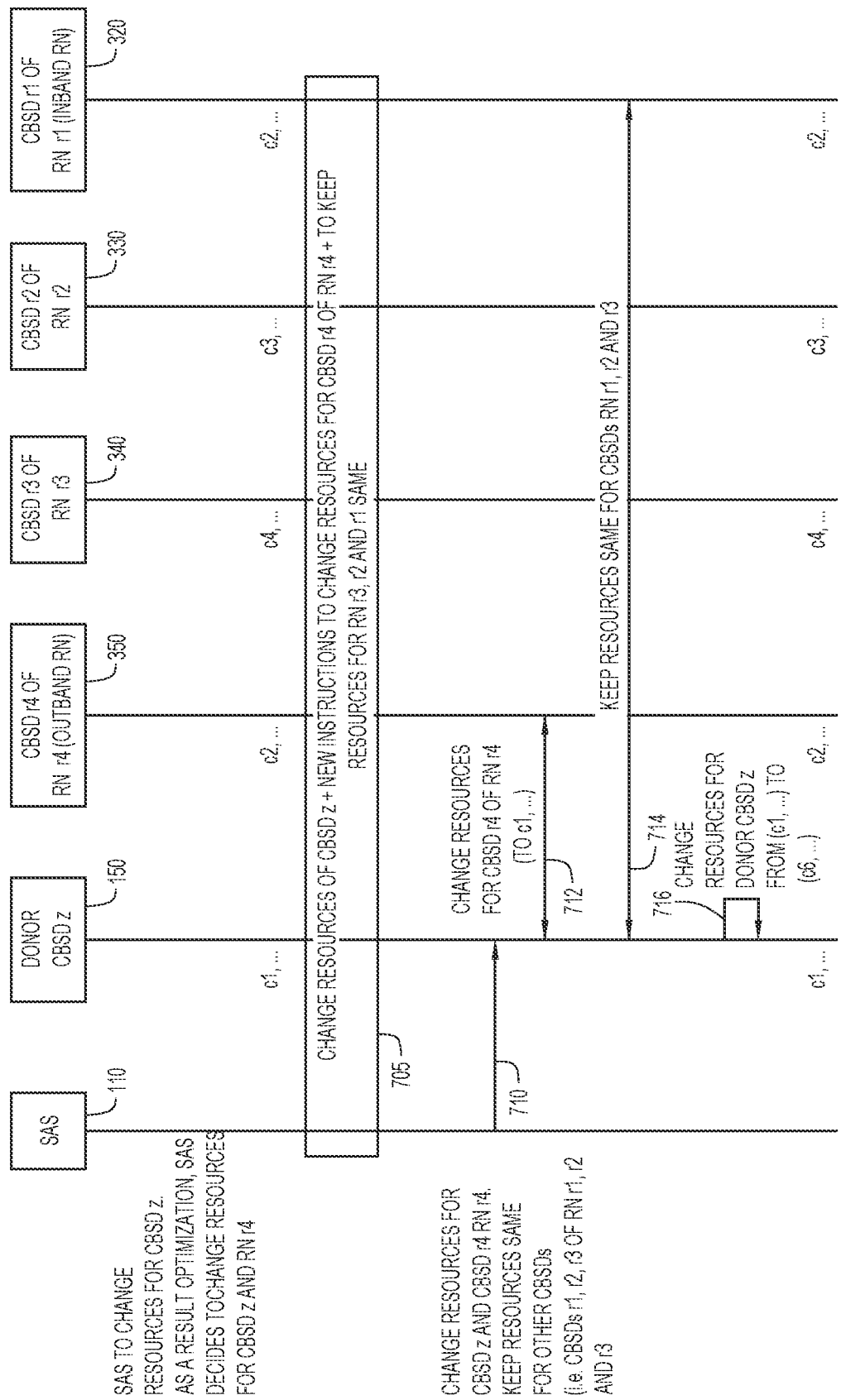
FIG. 7 is a ladder diagram depicting a series of operations for a scenario in which a SAS changes allocated resources for a given CBRS RN in accordance with an example embodiment.

Reference is made to FIG. 6, which is a flow chart depicting a series of operations for handling channel changes for a CBRS RN in accordance with an example embodiment, and to FIG. 7, which is a ladder diagram depicting a series of operations for a scenario in which a SAS changes allocated resources for a given CBRS RN in accordance with an example embodiment.

Assume, in this case, that Donor CBSD z 150 is using channel c1, CBSD r1 of CBRS RN r1 320 is using c2, CBSD r2 of RN r2 330 is using c3, CBSD r3 of RN r3 340 is using c4, and CBSD r4 of RN r4 350 is using c2. In each case, maxEIRP is also assigned by SAS 110.

Assume that SAS 110 determines, at 610, to change resources for CBSD r4 (of CBRS RN r4 350) from (c2, . . . ) to (c1, . . . ). If SAS 110 proceeds with such a resource change resources for CBSD r4 of RN r4 350 in this way, this can create performance issues for CBRS RN r4 350 as that given RN may not have the capability to handle the same channel on both of its air-interfaces. As such, at 612, SAS 110 considers resources being used by donor CBSD z 150 and other relay nodes. At 614, SAS 110 determines whether the performance of the given RN or other RNs may be degraded in view of the proposed change of resources. If no degradation is expected, then at 616, SAS changes the resources assigned to the given RN as initially proposed or intended. On the other hand, if a degradation is expected, then at 618, SAS 110 changes resources for impacted RNs (and even for the Donor CBSD as might be necessary).

The foregoing approach is shown in FIG. 7, where, at 705, SAS 110 undertakes an optimization with regard to resource allocation, and determines to change resources for Donor CBSD z 150 and CBSD r4 (CBRS RN 350), and to maintain or keep the same resources for the remaining CBRS RNs 320, 330, 340, as indicated. At 710, SAS 110 communicates with Donor CBSD z 150 accordingly. At 712, Donor CBSD z 150 communicates with CBSD RN 350 to change its channel to channel c1. At 714, Donor CBSD z 150 may do nothing or re-confirm that the remaining CBRS RNs 320, 330, 340 keep the same or prior resources. At 716, Donor CBSD z 150 changes its channel from channel c1 to channel c6.

Approach IV: Resource Optimization Using CBRS-Analytics Module at DNA-C

Figure 8:
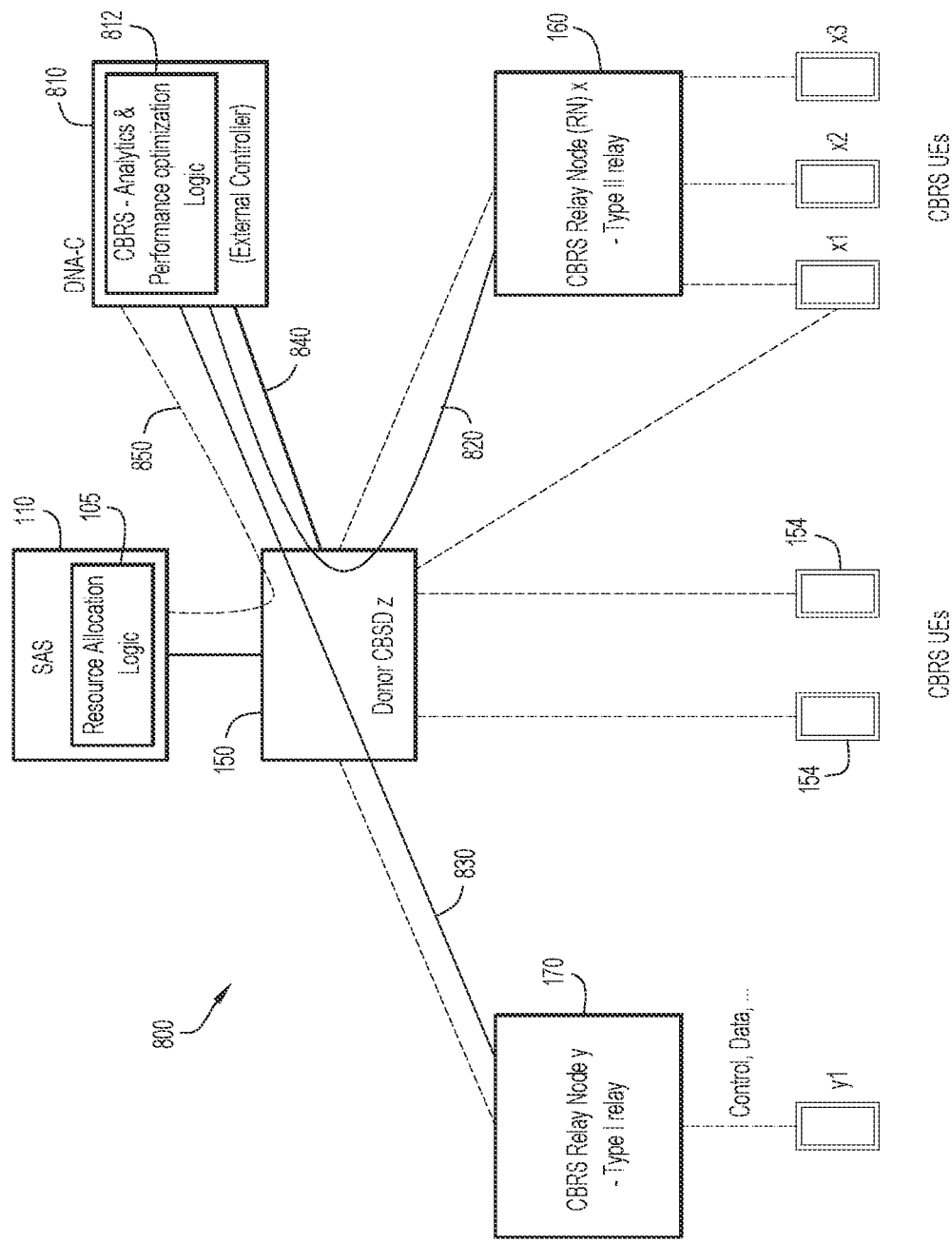
FIG. 8 shows a CBRS network topology that leverages a digital network application controller (DNA-C) to provide resource allocation logic in accordance with an example embodiment.

FIG. 8 shows a CBRS network topology 800 that leverages a digital network application controller (DNA-C) (or simply "external controller") 810 to provide resource allocation logic in accordance with an example embodiment. As shown, external controller 810 is in communication with CBRS RNs 160 and 170 via links 820, 830, respectively, which run through Donor CBSD z 150. External controller 810 is also in communication with Donor CBSD z 150 via link 840. With such links, CBRS RN and Donor CBSD z 150 capabilities along with other network topology and performance parameters can be provided to external controller 810. In such an implementation, SAS 110 might be considered to have a higher level view of the CBRS network 800 in a given area, while external controller 810 might have a more complete view of the network within an enterprise. As a result, external controller 810, and specifically CBRS—analytics & performance optimization logic 812, first estimates/considers/determines resources to be assigned to CBRS RNs 160, 170 and Donor CBSD z 150 in connection with initial resource allocation and subsequent proposed changes to resource allocation. Resulting suggestions or recommendations generated by external controller 810 may be provided to SAS 110 via link 850, (along, in one possible embodiment, with an indication as to a justification for such suggestions or recommendations) via Donor CBSD z 150. SAS 110 may then consider the suggestions along with other parameters in making final resource management decisions.

Figure 9:
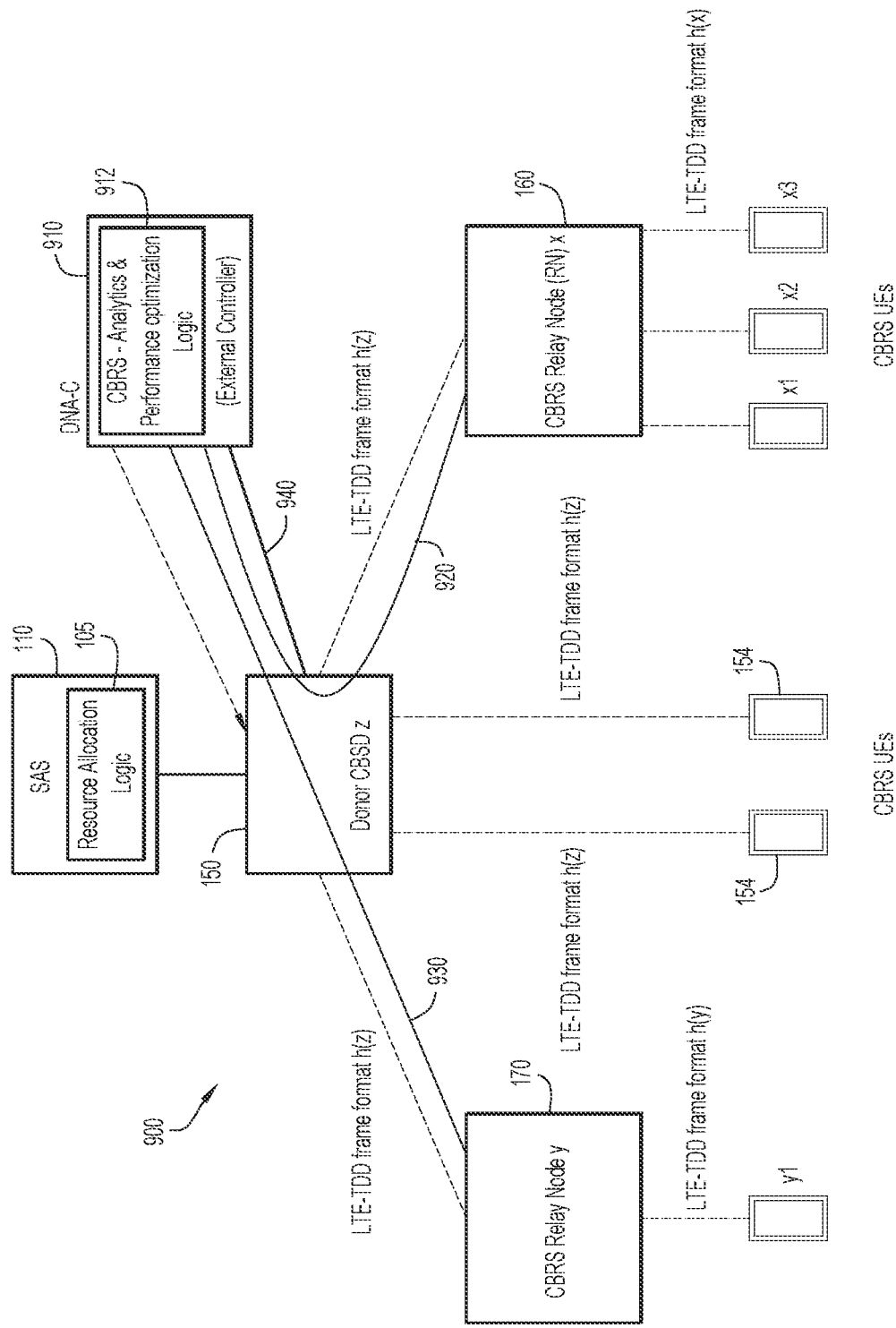
FIG. 9 shows a CBRS network topology that leverages a DNA-C to provide additional resource allocation logic in accordance with an example embodiment.

Approach V: Selection of Suitable LTE-TDD Frame Configurations for CBRS RNs and Donor CBSD FIG. 9 shows a CBRS network topology 900 that leverages a DNA-C (or external controller) 910 that hosts CBRS analytics & performance optimization logic 912 to provide additional resource allocation logic in accordance with an example embodiment. As discussed earlier, a LTE-TDD base station uses a LTE-TDD format that consists of a pattern of slots for DL and UL communication. For example, LTE TDD configuration 1 supports DSUUDDSUUD where LTE subframe numbers 0, 4, 5 and 9 can be used for DL communication, subframe numbers 2, 3, 7 and 8 can be used for UL communication, and subframe numbers 1 and 6 are reserved for special frames.

As shown in FIG. 9, Donor CBSD z 150 could be serving many CBRS RNs 160, 170 in an area, and each such CBRS RN may have a different type of requirement for its LTE-TDD frame format. For example, one CBRS RN-UE pair may have higher DL traffic compared to another CBRS RN-UE pair, which may have higher UL traffic. As each Donor CBSD chooses its own TDD frame format, this can lead to incompatible TDD frame formats for some devices (e.g., RNs or UEs) thereby degrading their performance. For example, latency may increase for some UEs and throughput may be degraded.

To address this issue, and in accordance with an embodiment, external controller 910 collects and analyzes a variety of parameters from UEs (such as downlink and uplink throughput, type of applications running on each UE—e.g. downlink latency sensitive, uplink latency sensitive, best effort only etc.) and CBRS RNs via links 920, 930 (and from Donor CBSD z 150 via link 940). The LTE-TDD frame format used by Donor CBSD z 150 is also provided to external controller 910. This information is analyzed by external controller 910 and suitable LTE-TDD frame format configurations are selected and communicated to Donor CBSD z 150 and CBRS RNs 160, 170 (e.g., LTE-TDD frame format h(x), LTE-TDD frame format h(y), LTE-TDD frame format h(z)). Note that some 3GPP releases do not allow a change to a TDD frame configuration at any arbitrary time. In such scenarios, it is possible to change frame formats at the same time as changing channel resources as described above.

In accordance with a different embodiment, it is possible that a Donor CBSD allocates resources for CBRS RNs. In this case, it is possible to further enhance the Donor CBSD-SAS registration procedure wherein the Donor CBSD can optionally indicate a presence of RNs and ask for a pool of channels (along with max EIRP for each such channel). The Donor CBSD may then allocate resources to the CBRS RNs. These resource allocations may be communicated to the CBRS RNs by appropriately enhancing LTE RRC messages. If all CBRS RNs support inband operation, the Donor CBSD could potentially use same the channel for all CBRS RNs. The Donor CBSD might also offload this function to external controller (e.g., 910).

In the above described embodiment, a Donor CBSD may be considered to be functioning as a "mini-SAS", but may only have a limited view of the network. As such, it may be more desirable to have external controller (e.g., 910) perform this functionality due to its more central view of the network and thus its knowledge of information regarding the Donor CBSD, CBRS RNs and UEs.

In sum, as CBRS access points get deployed, it becomes important to enhance coverage and capacity for cell edge (and other) users. As described herein, LTE (e.g., CBRS) relay nodes are used to provide enhanced coverage and capacity in such scenarios, and approaches are provided that help to reduce interference in CBRS networks.

Figure 10:
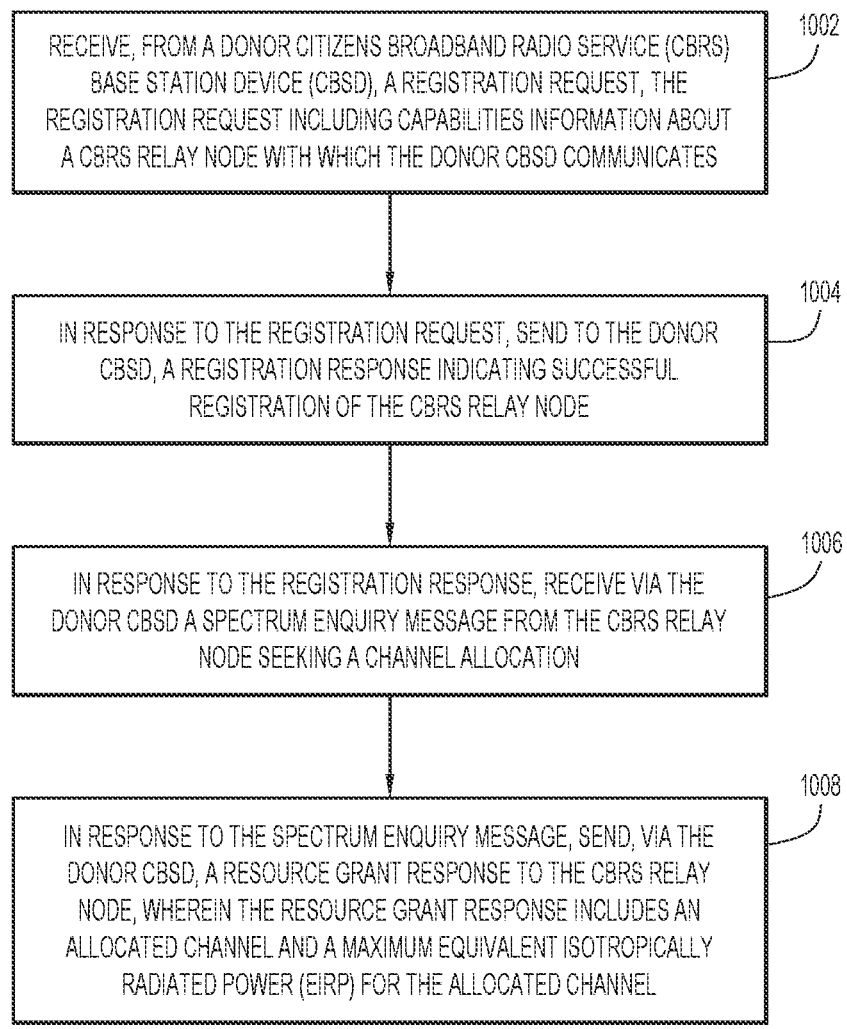
FIG. 10 is a flow chart depicting a series of operations for allocating resources in a CBRS network having CBRS RNs in accordance with an example embodiment.

FIG. 10 is a flow chart depicting a series of operations for allocating resources in a CBRS network having CBRS RNs in accordance with an example embodiment. The operations are described as being performed by a SAS, but those skilled in the art will appreciate that another device (e.g., a controller such as external controller 810 or 910) may also perform some or all of these operations. At 1002, a SAS receives, from a Donor citizens broadband radio service (CBRS) base station device (CBSD), a registration request, the registration request including capabilities information about a CBRS Relay Node with which the Donor CBSD communicates. At 1004, in response to the registration request, the SAS sends to the Donor CBSD, a registration response indicating successful registration of the CBRS Relay Node. At 1006, in response to the registration response, the SAS receives via the Donor CBSD a spectrum enquiry message from the CBRS Relay Node seeking a channel allocation. And, at 1008, and in response to the spectrum enquiry message, the SAS sends, via the Donor CBSD, a resource grant response to the CBRS Relay Node, wherein the resource grant response includes an allocated channel and a maximum Equivalent Isotropically Radiated Power (EIRP) for the allocated channel.

Figure 11:
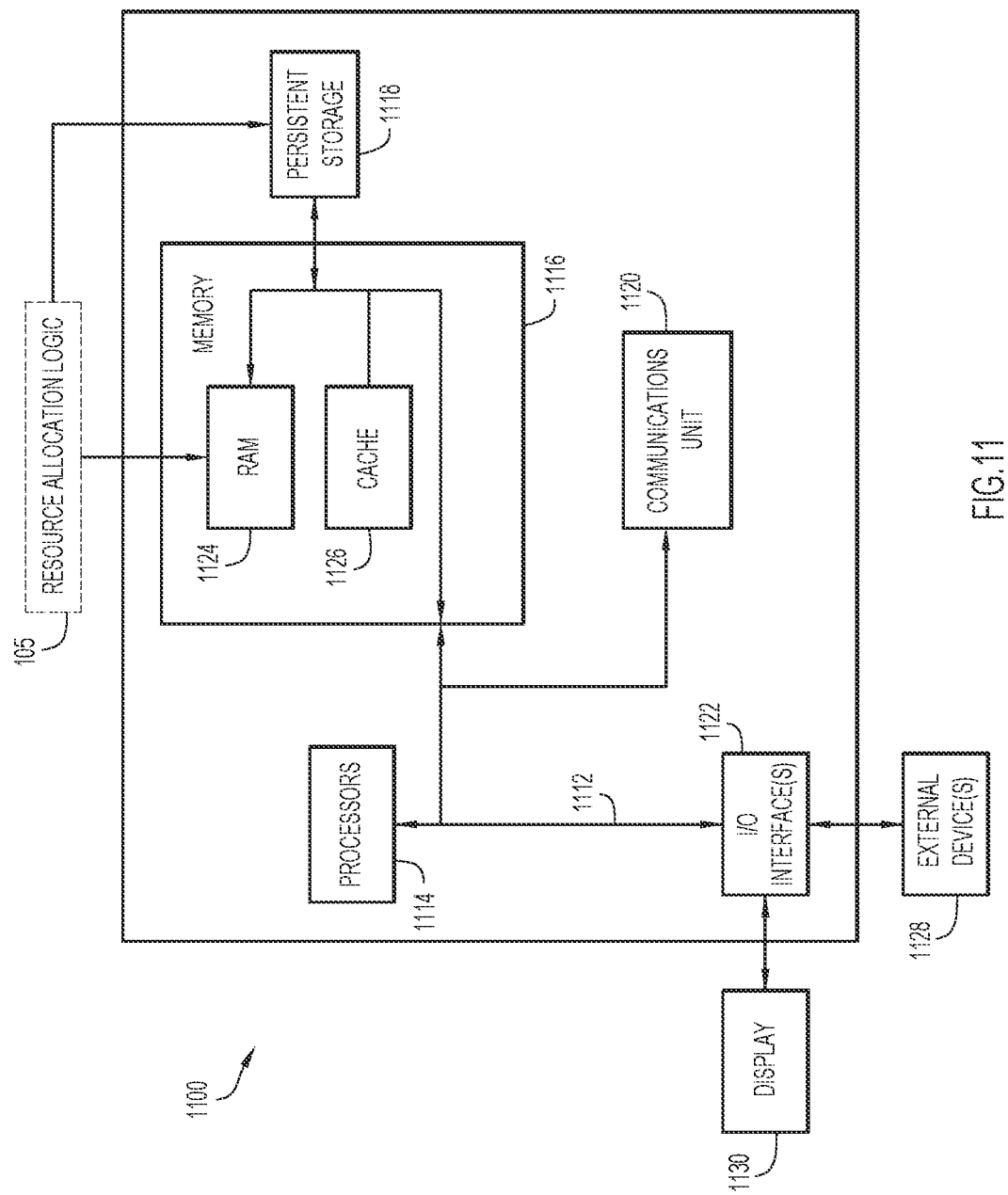
FIG. 11 depicts a device (e.g., a SAS or external controller) that executes resource allocation logic in accordance with an example embodiment.

FIG. 11 depicts a device 1100 (e.g., a SAS or external controller) that executes resource allocation logic 105 in accordance with an example embodiment. It should be appreciated that FIG. 11 provides only an illustration of one embodiment and does not imply any limitations with regard to the environments in which different embodiments may be implemented. Many modifications to the depicted environment may be made. Indeed, in many implementations of a SAS or external controller configured to host resource allocation logic 105, much of the hardware described below may not be needed.

As depicted, the device 1100 includes a bus 1112, which provides communications between computer processor(s) 1114, memory 1116, persistent storage 1118, communications unit 1120, and input/output (I/O) interface(s) 1122. Bus 1112 can be implemented with any architecture designed for passing data and/or control information between processors (such as microprocessors, communications and network processors, etc.), system memory, peripheral devices, and any other hardware components within a system. For example, bus 1112 can be implemented with one or more buses.

Memory 1116 and persistent storage 1118 are computer readable storage media. In the depicted embodiment, memory 1116 includes random access memory (RAM) 1124 and cache memory 1126. In general, memory 1116 can include any suitable volatile or non-volatile computer readable storage media. Instructions for the "resource allocation logic" may be stored in memory 1116 or persistent storage 1118 for execution by processor(s) 1114.

One or more programs may be stored in persistent storage 1118 for execution by one or more of the respective computer processors 1114 via one or more memories of memory 1116. The persistent storage 1118 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1118 may also be removable. For example, a removable hard drive may be used for persistent storage 1118. Other examples include optical and magnetic disks, thumb drives, and smart cards that are inserted into a drive for transfer onto another computer readable storage medium that is also part of persistent storage 1118.

Communications unit 1120, in these examples, provides for communications with other data processing systems or devices. In these examples, communications unit 1120 includes one or more network interface cards. Communications unit 1120 may provide communications through the use of either or both physical and wireless communications links.

I/O interface(s) 1122 allows for input and output of data with other devices that may be connected to computer device 1100. For example, I/O interface 1122 may provide a connection to external devices 1128 such as a keyboard, keypad, a touch screen, and/or some other suitable input device. External devices 1128 can also include portable computer readable storage media such as database systems, thumb drives, portable optical or magnetic disks, and memory cards.

Software and data used to practice embodiments can be stored on such portable computer readable storage media and can be loaded onto persistent storage 1118 via I/O interface(s) 1122. I/O interface(s) 1122 may also connect to a display 1130. Display 1130 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes at a spectrum access system, receiving, from a Donor citizens broadband radio service (CBRS) base station device (CBSD), a registration request, the registration request including capabilities information about a CBRS Relay Node with which the Donor CBSD communicates; in response to the registration request, sending, from the spectrum access system to the Donor CBSD, a registration response indicating successful registration of the CBRS Relay Node; in response to the registration response, receiving via the Donor CBSD a spectrum enquiry message from the CBRS Relay Node seeking a channel allocation from the spectrum access system; and in response to the spectrum enquiry message, sending from the spectrum access system, and via the Donor CBSD, a resource grant response to the CBRS Relay Node, wherein the resource grant response includes an allocated channel and a maximum Equivalent Isotropically Radiated Power (EIRP) for the allocated channel.

In an embodiment, the capabilities information about the CBRS Relay Node may include an indication of a location of the CBRS Relay Node and an indication of a type of the CBRS Relay Node.

In one embodiment, the indication of the type of the CBRS Relay Node may include an indication regarding whether the CBRS Relay Node is an inband relay node or an outband relay node.

In another embodiment, the method includes selecting the allocated channel and maximum EIRP based on the location of the CBRS Relay Node and the type of the CBRS Relay Node.

In still another embodiment, the method includes the spectrum access system determining that an allocated channel for the Donor CBSD should be changed; and the spectrum access system determining whether a proposed new channel for the Donor CBSD will cause interference with the CBRS Relay Node.

The method may still further include, when the spectrum access system determines that the proposed new channel for the Donor CBSD will cause interference with the CBRS Relay Node, providing a new allocated channel, respectively, to the Donor CBSD and to the CBRS Relay Node.

The method may still further include the spectrum access system determining that the allocated channel for the CBRS Relay Node should be changed; and the spectrum access system determining whether a proposed new channel for the CBRS Relay Node will cause interference for the CBRS Relay Node or for another CBRS Relay Node.

In an embodiment, the method may include when the spectrum access system determines that the proposed new channel for the CBRS Relay Node will cause interference for the CBRS Relay Node or for another CBRS Relay Node, providing a new allocated channel, respectively, to the Donor CBSD and to the CBRS Relay Node In still another embodiment, the method may include receiving from an external controller, at the spectrum access system, a recommendation regarding how to allocate channels to the Donor CBSD and to the CBRS Relay Node.

And, the method may also include selecting a time division duplex (TDD) format for the CBRS Relay Node.

In another form, a device may also be provided in accordance with an embodiment. The device may include an interface unit configured to enable network communications; a memory; and one or more processors coupled to the interface unit and the memory, and configured to: receive, from a Donor citizens broadband radio service (CBRS) base station device (CBSD), a registration request, the registration request including capabilities information about a CBRS Relay Node with which the Donor CBSD communicates; in response to the registration request, send to the Donor CBSD, a registration response indicating successful registration of the CBRS Relay Node; in response to the registration response, receive via the Donor CBSD a spectrum enquiry message from the CBRS Relay Node seeking a channel allocation; and in response to the spectrum enquiry message, send, via the Donor CBSD, a resource grant response to the CBRS Relay Node, wherein the resource grant response includes an allocated channel and a maximum Equivalent Isotropically Radiated Power (EIRP) for the allocated channel.

In an embodiment, the capabilities information about the CBRS Relay Node may include an indication of a location of the CBRS Relay Node and an indication of a type of the CBRS Relay Node.

In an embodiment, the indication of the type of the CBRS Relay Node may include an indication regarding whether the CBRS Relay Node is an inband relay node or an outband relay node.

In an embodiment the one or more processors may be configured to select the allocated channel and maximum EIRP based on the location of the CBRS Relay Node and the type of the CBRS Relay Node.

In an embodiment the one or more processors may be configured to determine that an allocated channel for the Donor CBSD should be changed; and determine whether a proposed new channel for the Donor CBSD will cause interference with the CBRS Relay Node.

In an embodiment the one or more processors may be configured to when it is determined that the proposed new channel for the Donor CBSD will cause interference with the CBRS Relay Node, provide a new allocated channel, respectively, to the Donor CBSD and to the CBRS Relay Node.

In an embodiment the one or more processors may be configured to determine that the allocated channel for the CBRS Relay Node should be changed; and determine whether a proposed new channel for the CBRS Relay Node will cause interference for the CBRS Relay Node or for another CBRS Relay Node.

In an embodiment the one or more processors may be configured to when it is determined that the proposed new channel for the CBRS Relay Node will cause interference for the CBRS Relay Node or for another CBRS Relay Node, provide a new allocated channel, respectively, to the Donor CBSD and to the CBRS Relay Node.

In still another form, a non-transitory computer readable storage media is provided that is encoded with instructions that, when executed by a processor, cause the processor to receive, from a Donor citizens broadband radio service (CBRS) base station device (CBSD), a registration request, the registration request including capabilities information about a CBRS Relay Node with which the Donor CBSD communicates; in response to the registration request, send to the Donor CBSD, a registration response indicating successful registration of the CBRS Relay Node; in response to the registration response, receive via the Donor CBSD a spectrum enquiry message from the CBRS Relay Node seeking a channel allocation; and in response to the spectrum enquiry message, send, via the Donor CBSD, a resource grant response to the CBRS Relay Node, wherein the resource grant response includes an allocated channel and a maximum Equivalent Isotropically Radiated Power (EIRP) for the allocated channel.

In this form, the capabilities information about the CBRS Relay Node may include an indication of a location of the CBRS Relay Node and an indication of a type of the CBRS Relay Node.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a spectrum access system, receiving, from a Donor citizens broadband radio service (CBRS) base station device (CBSD), a registration request, the registration request including capabilities information about a CBRS Relay Node with which the Donor CBSD communicates;
   in response to the registration request, sending, from the spectrum access system to the Donor CBSD, a registration response indicating successful registration of the CBRS Relay Node;
   in response to the registration response, receiving via the Donor CBSD a spectrum enquiry message from the CBRS Relay Node seeking a channel allocation from the spectrum access system; and
   in response to the spectrum enquiry message, sending from the spectrum access system, and via the Donor CBSD, a resource grant response to the CBRS Relay Node, wherein the resource grant response includes an allocated channel and a maximum Equivalent Isotropically Radiated Power (EIRP) for the allocated channel.

2. The method of claim 1, wherein the capabilities information about the CBRS Relay Node comprises an indication of a location of the CBRS Relay Node and an indication of a type of the CBRS Relay Node.

3. The method of claim 2, wherein the indication of the type of the CBRS Relay Node includes an indication regarding whether the CBRS Relay Node is an inband relay node or an outband relay node.

4. The method of claim 3, further comprising selecting the allocated channel and maximum EIRP based on the location of the CBRS Relay Node and the type of the CBRS Relay Node.

5. The method of claim 1, further comprising:
   the spectrum access system determining that an allocated channel for the Donor CBSD should be changed; and
   the spectrum access system determining whether a proposed new channel for the Donor CBSD will cause interference with the CBRS Relay Node.

6. The method of claim 5, further comprising:
when the spectrum access system determines that the proposed new channel for the Donor CBSD will cause interference with the CBRS Relay Node, providing a new allocated channel, respectively, to the Donor CBSD and to the CBRS Relay Node.

7. The method of claim 1, further comprising:
the spectrum access system determining that the allocated channel for the CBRS Relay Node should be changed; and
the spectrum access system determining whether a proposed new channel for the CBRS Relay Node will cause interference for the CBRS Relay Node or for another CBRS Relay Node.

8. The method of claim 7, further comprising:
when the spectrum access system determines that the proposed new channel for the CBRS Relay Node will cause interference for the CBRS Relay Node or for another CBRS Relay Node, providing a new allocated channel, respectively, to the Donor CBSD and to the CBRS Relay Node.

9. The method of claim 1, further comprising, receiving from an external controller, at the spectrum access system, a recommendation regarding how to allocate channels to the Donor CBSD and to the CBRS Relay Node.

10. The method of claim 1, further comprising, selecting a time division duplex (TDD) format for the CBRS Relay Node.

11. A device comprising:
an interface unit configured to enable network communications;
a memory; and
one or more processors coupled to the interface unit and the memory, and configured to:
receive, from a Donor citizens broadband radio service (CBRS) base station device (CBSD), a registration request, the registration request including capabilities information about a CBRS Relay Node with which the Donor CBSD communicates;
in response to the registration request, send to the Donor CBSD, a registration response indicating successful registration of the CBRS Relay Node;
in response to the registration response, receive via the Donor CBSD a spectrum enquiry message from the CBRS Relay Node seeking a channel allocation; and
in response to the spectrum enquiry message, send, via the Donor CBSD, a resource grant response to the CBRS Relay Node, wherein the resource grant response includes an allocated channel and a maximum Equivalent Isotropically Radiated Power (EIRP) for the allocated channel.

12. The device of claim 11, wherein the capabilities information about the CBRS Relay Node comprises an indication of a location of the CBRS Relay Node and an indication of a type of the CBRS Relay Node.

13. The device of claim 12, wherein the indication of the type of the CBRS Relay Node includes an indication regarding whether the CBRS Relay Node is an inband relay node or an outband relay node.

14. The device of claim 13, wherein the one or more processors are further configured to select the allocated channel and maximum EIRP based on the location of the CBRS Relay Node and the type of the CBRS Relay Node.

15. The device of claim 13, wherein the one or more processors are further configured to:
determine that an allocated channel for the Donor CBSD should be changed; and
determine whether a proposed new channel for the Donor CBSD will cause interference with the CBRS Relay Node.

16. The device of claim 15, wherein the one or more processors are further configured to:
when it is determined that the proposed new channel for the Donor CBSD will cause interference with the CBRS Relay Node, provide a new allocated channel, respectively, to the Donor CBSD and to the CBRS Relay Node.

17. The device of claim 11, wherein the one or more processors are further configured to:
determine that the allocated channel for the CBRS Relay Node should be changed; and
determine whether a proposed new channel for the CBRS Relay Node will cause interference for the CBRS Relay Node or for another CBRS Relay Node.

18. The device of claim 17, wherein the one or more processors are further configured to:
when it is determined that the proposed new channel for the CBRS Relay Node will cause interference for the CBRS Relay Node or for another CBRS Relay Node, provide a new allocated channel, respectively, to the Donor CBSD and to the CBRS Relay Node.

19. A non-transitory computer readable storage media encoded with instructions that, when executed by a processor, cause the processor to:
receive, from a Donor citizens broadband radio service (CBRS) base station device (CBSD), a registration request, the registration request including capabilities information about a CBRS Relay Node with which the Donor CBSD communicates;
in response to the registration request, send to the Donor CBSD, a registration response indicating successful registration of the CBRS Relay Node;
in response to the registration response, receive via the Donor CBSD a spectrum enquiry message from the CBRS Relay Node seeking a channel allocation; and
in response to the spectrum enquiry message, send, via the Donor CBSD, a resource grant response to the CBRS Relay Node, wherein the resource grant response includes an allocated channel and a maximum Equivalent Isotropically Radiated Power (EIRP) for the allocated channel.

20. The non-transitory computer readable storage media of claim 19, wherein the capabilities information about the CBRS Relay Node comprises an indication of a location of the CBRS Relay Node and an indication of a type of the CBRS Relay Node.

* * * * *